(12) United States Patent
Selfridge

(10) Patent No.: US 11,365,002 B2
(45) Date of Patent: *Jun. 21, 2022

(54) AERIAL SYSTEM UTILIZING A TETHERED UNI-ROTOR NETWORK OF SATELLITE VEHICLES

(71) Applicant: Justin M Selfridge, Newport News, VA (US)

(72) Inventor: Justin M Selfridge, Newport News, VA (US)

(*) Notice: Subject to any disclaimer, the term of this patent is extended or adjusted under 35 U.S.C. 154(b) by 131 days.

This patent is subject to a terminal disclaimer.

(21) Appl. No.: 17/072,201

(22) Filed: Oct. 16, 2020

(65) Prior Publication Data
US 2021/0086895 A1    Mar. 25, 2021

Related U.S. Application Data

(63) Continuation-in-part of application No. 15/430,475, filed on Feb. 11, 2017, now Pat. No. 10,807,709.

(51) Int. Cl.
*B64C 39/02* (2006.01)

(52) U.S. Cl.
CPC ........ *B64C 39/022* (2013.01); *B64C 2201/02* (2013.01); *B64C 2201/044* (2013.01); *B64C 2201/104* (2013.01); *B64C 2201/165* (2013.01)

(58) Field of Classification Search
CPC ......... B64C 39/022; B64C 37/02; B64D 1/22; B64D 2201/128
See application file for complete search history.

(56) References Cited

U.S. PATENT DOCUMENTS

| | | | | |
|---|---|---|---|---|
| 1,181,784 A | * | 5/1916 | McCurry | B64C 27/82 244/17.19 |
| 2,373,086 A | * | 4/1945 | Alabrune | B64D 1/02 244/137.1 |
| 4,416,436 A | * | 11/1983 | Wilson, Jr. | B64D 1/22 244/137.1 |
| 5,074,489 A | * | 12/1991 | Gamzon | B64C 37/02 244/114 R |

(Continued)

*Primary Examiner* — Richard G Davis
(74) *Attorney, Agent, or Firm* — Eric Hanscom

(57) ABSTRACT

A tethered uni-rotor network of multiple tethered satellite vehicles; each having lifting airfoil surfaces, stabilizers, control surfaces, fuselages, and propulsion systems, operating in persistent state of rotation, driven by propulsion units on each satellite vehicle, where airfoils generate lift which supports aerial system. As system rotates, centrifugal forces pull satellite vehicles outwards, which keeps tethers taught. The tethers are attached to inboard portions of each lifting surface, which places their structural members under tension, thereby eliminating an adverse bending moment common to all traditional fixed-wing aircraft. Tethers provide large spatial separation eliminating rotor downwash field interactions, slowing system rotation rate, and permitting an ideal elliptic load distribution across wings. This reduces weight within structural members, uses higher aspect ratio wings to minimize induced drag, and employ thin-thickness high-camber airfoil profiles for superior lift-to-drag ratios, resulting in a more aerodynamically efficient aircraft, requiring less power than fixed-wing without sacrificing hover capability.

30 Claims, 19 Drawing Sheets

(56) References Cited

U.S. PATENT DOCUMENTS

| | | | | |
|---|---|---|---|---|
| 5,395,070 A | * | 3/1995 | Stirbl | F24S 23/00 60/641.11 |
| 8,308,142 B1 | * | 11/2012 | Olson | B64D 3/00 244/137.1 |
| 2011/0084162 A1 | * | 4/2011 | Goossen | B64D 1/22 244/135 C |
| 2018/0002011 A1 | * | 1/2018 | McCullough | B64C 27/28 |

* cited by examiner

AERIAL SYSTEM UTILIZING A TETHERED UNI-ROTOR NETWORK OF SATELLITE VEHICLES

CROSS REFERENCE TO RELATED APPLICATIONS

This application claims priority back to U.S. Utility patent application Ser. No. 15/430,475, filed Feb. 11, 2017, the contents of which are incorporated by reference into this application.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of aerial systems, and more specifically toward an aerial system utilizing a tethered uni-rotor network of satellite vehicles; which is, in particular embodiments, an aerial system that operates in a persistent state of rotation, such that the lifting surfaces are placed under tension from centrifugal forces; thereby, alleviating an adverse bending moment, reducing weight within structural members, increasing the aspect ratio of the wing, and allowing for thin-thickness high-camber airfoil profiles with better lift-to-drag ratios; which yields a more aerodynamically efficient and low-power aircraft, without sacrificing a hover capability.

Fixed-wing aircraft, particularly gliders, are very efficient vehicles which attempt to minimize the amount of drag acting on the system. One of the primary means available to engineers to achieve this is to increase the aspect ratio of the wing, which is the ratio between the wingspan and the chord length. A high aspect ratio wing is desirable from an aerodynamic drag perspective, because it reduces the amount of induced drag; however, there are limitations with this approach. As the wing becomes more slender, with a higher aspect ratio, it becomes much more flexible and can experience bend and twist during flight. Furthermore, longer wings are prone to greater bending moments. Counteracting this increased moment at the wing root, which is the attachment point between the fuselage and wing, requires additional structural material to reinforce this connection point. Counteracting this increased moment across the lifting surface, requires thicker airfoil profiles with larger drag coefficients. Finally, fixed-wing aircraft need a forward velocity to facilitate airflow over the airfoil to produce lift, so these systems cannot hover or takeoff vertically.

Unlike fixed-wing aircraft, helicopters have desirable vertical takeoff and landing (VTOL) and hovering capabilities. Consider a helicopter at rest on a tarmac. The rotor blades are generally so thin, that they bend and deflect under their own weight. However, these flimsy structures are capable of lifting a heavy vehicle once they are spinning, because they benefit from centrifugal forces which provide stiffening throughout the rotor element. The downside for such a rotor design, is it is not aerodynamically efficient. The rotors suffer from triangular span loading, meaning the outboard sections are primarily responsible for producing lift, while the inboard sections are quite ineffectual. Because a majority of the weight of the helicopter is concentrated at the center, the rotors must spin at very high angular rates, such that each rotor acts in a turbulent downwash field from its leading neighbor.

Thus, there has existed a long-felt need for an improved aerial system. One that can employ higher aspect ratio wings without sacrificing structural robustness. One that reduces structural weight by alleviating a bending moment across slender lifting surfaces. One that can leverage thin-thickness high-camber airfoils for better lift-to-drag ratios, without introducing flexibility across the wing. One that can hover and translate, but also reduces drag by achieving an ideal elliptic span load distribution without rotor downwash field interactions. One that is stable and controllable in flight, can carry a payload, and offers desirable vertical takeoff and landing capabilities, while also increasing flight endurance.

SUMMARY OF THE INVENTION

The current invention provides just such a solution with an aerial system utilizing a tethered uni-rotor network of satellite vehicles. The concept is made up of multiple tethered satellite vehicles; each having lifting airfoil surfaces, stabilizers, control surfaces, fuselages, and propulsion systems. The entire system operates in a persistent state of rotation, which is driven by the propulsion units on each satellite vehicle. As each satellite vehicle moves through space, its airfoil generates lift which supports the weight of the aerial system. As the system rotates, centrifugal forces pull each satellite vehicle outwards, which keeps each tether taught. The tethers are attached to the innermost portions of each lifting surface, and the energy storage mass is located at the outermost portion of each lifting surface, which applies tension across the structural members of each of the lifting surfaces. By placing tension throughout the lifting surfaces, the tethered uni-rotor network is able to: alleviate the bending moment common to fixed-wing aircraft, reduce the weight within the structural members, employ higher aspect ratio wings to reduce induced drag, and use thin-thickness high-camber airfoil profiles which achieve higher lift-to-drag ratios than standard practice. These features yield a more aerodynamically efficient aircraft, which requires less power than fixed-wing embodiments, without sacrificing VTOL and hover capabilities.

A goal of a tethered uni-rotor network system, according to selected embodiments disclosed herein, is to use centrifugal stiffening inherent within a traditional helicopter configuration, to solve the engineering tradeoff between aerodynamic efficiency and structural robustness inherent within traditional fixed-wing aircraft designs. Furthermore, the tethered uni-rotor network system seeks to overcome the limitations of helicopters (high rotor angular rates, turbulent airflow over the rotors, triangular span loading, and downwash field interactions) and to overcome the limitations of high aspect ratio fixed-wing aircraft (flexibility, bending moments, structural weight at the wing root, and thick airfoil profiles).

It is an object of the invention to provide an aerial system with improved aerodynamic efficiency by reducing aerodynamic drag.

It is additionally an object of the invention to provide an aerial system with increased structural rigidity by leveraging centrifugal stiffening.

It is an object of the invention to place the energy storage masses at the outermost radius thereby slowing the angular rate of the aerial system.

It is an object of the invention to attach each tether to the innermost portion of each satellite vehicle, such that each of the structural members of the lifting surfaces are placed under tension.

It is an object of the invention to provide an aerial system that uses less power and offers increased flight endurance over comparable sized fixed-wing aircraft.

It is also an object of the invention to provide an aerial system that operates at a high altitude for an extended period of time.

It is a further object of this invention to provide a solar-powered aerial system, which consumes sufficiently low levels of energy, such that it may remain airborne for an indefinite period of time.

As used herein, a "tethered uni-rotor network" shall describe the complete aerial system.

As used herein, a "satellite vehicle" shall describe the component that contains the fuselages, winged lifting surfaces, stabilizers, control surfaces, and propulsion units.

As used herein, a "tether" shall describe the flexible cable which connects a satellite vehicle to the rest of the aerial system, and which maintains tension forces arising from the rotation of the aerial system.

As used herein, for some selected embodiments, a "central hub" shall describe the centermost component of a hub-and-spoke arrangement, to which all the tethers are permanently secured.

The most general embodiment of the current disclosure is an aerial system comprising multiple satellite vehicles secured with tethers. Each satellite vehicle comprises several components, including: fuselages, which house avionics components; winged airfoil sections, which produce lift; structural members, which provide rigidity within the wing and maintain the shape of the airfoil profile; energy storage mass, which provides the fuel consumed by the system; propulsion units, which provide thrust to counteract aerodynamic drag; stabilizer surfaces, which help the satellite vehicle mitigate external disturbances; and control surfaces, which maintain the desired trajectory of each satellite vehicle. The tether is a thin filament cable which transmits tension forces between a satellite vehicle and the rest of the aerial system.

A preferred embodiment for the tethered uni-rotor network, has a central hub with tethers radiating outward in a hub-and-spoke arrangement, where each tether attaches to its respective satellite vehicle. This provides a central location for carrying a payload package, and allows for independent control laws to act on each satellite vehicle. However, other tether layouts are also permissible, and may offer some notable advantages. One such alternative embodiment eliminates the central hub component, and has two tethers connected to each satellite vehicle, one attaching to its leading neighbor, and one attaching to its trailing neighbor. While this approach may have more complicated dynamic interactions, it reduces the magnitude of the tension force on each tether, and it helps ensure equal spacing between all the satellite vehicles while operating under windy conditions.

A preferred embodiment for the number of satellite vehicles is four. This allows for the easiest control methodology and permits redundancy in the event a satellite vehicle becomes disabled. However, other numbers of satellite vehicles are permissible. Two satellite vehicles are the minimum number needed to counter balance the rotation, but if a central hub is used, this approach does not completely stabilize that component, which is free to swing like a hammock. As such, two satellite vehicles should be used when there is no central hub, or reserved for times when the other satellite vehicles have become disabled, or for applications when the central hub is constrained in other ways, such as within an airborne wind energy device. Three satellite vehicles is the minimum number needed to completely stabilize the central hub, if one is present. However, an odd number of satellite vehicles is more difficult to control, because pairs of satellite vehicles are not directly opposing one another, and it does not offer any redundancy in the event of a satellite vehicle failure. Four satellite vehicles is a preferred embodiment because the control law is easier to implement with pairs of satellite vehicles directly opposing one another, and it offers a redundancy in the event of a failure; albeit with a slight compromise on centrifugal stiffening when compared to three satellite vehicles. Any number of satellite vehicles greater than or equal to five is also conceivable, and can offer increased redundancy and robustness. However, with each additional satellite vehicle the amount of beneficial centrifugal stiffening decreases and the complexity of the system increases, so using more satellite vehicles represents a standard engineering tradeoff.

A preferred embodiment for the attachment point between each tether and its respective satellite vehicle, is placed on the airfoil camber line at the quarter chord of the innermost wingtip. However, adjusting the camber line and quarter chord positions may be used to facilitate trimming. For instance, attachment points fore or aft will adjust the relative yaw heading with respect to the rotating frame of the aerial system, and attachment points higher or lower than the camber line will adjust the trimmed roll attitude of the satellite vehicle wing. Furthermore, while the innermost wingtip is the preferred embodiment to maximize tension across the structural members of the wing, other engineering design or manufacturing considerations may need to deviate from this ideal location.

A preferred embodiment for the wing surface is a single, flat, horizontal, mono-wing. This is expected to be the simplest configuration which provides the greatest benefit to the tethered uni-rotor network system. However, alternative configurations are acceptable. Multiple lifting surfaces in various locations may provide enhanced stabilization or controllability for the entire aerial system.

A preferred embodiment for the placement of the energy storage mass is located at the outermost wingtip of each satellite vehicle, because this location: (1) places the entire length of the wing under tension, and (2) minimizes the rotation rate of the tethered uni-rotor network system. However, alternative locations have merit. Housing the energy storage mass within the wing structure, slightly compromises the amount of tension across the wingspan, but provides a more uniform wing loading distribution. Finally, as with nearly all aircraft, some compromises might exist which need to adjust the location of the center of gravity, to accommodate other components, such as landing gear placement or control surface effectiveness.

Each satellite vehicle has a structural member, which maintains the shape and rigidity of the airfoil, and is responsible for supporting the tension across the wing. A preferred embodiment for the structural member is a carbon fiber composite skin, which is bonded to an inner foam core with the desired airfoil profile. Other materials may also be used, such as: fiberglass, aramid fibers, aluminum, honeycomb core, or wood, to name a few. This approach minimizes manufacturing complexity, and places the structural material at a maximum distance away from the neutral axis. However, other embodiments may be necessary, especially when placing the energy storage mass within the wing structure. In such cases, more traditional wing designs may be employed; such as: spar beams, spar boxes, I-beams, airfoil ribs, D-box leading edge, and/or tapered trailing edges.

A preferred embodiment uses a thin-thickness and high-camber airfoil profile, which produces lift at a zero angle-of-attack. The pressure distribution for such an airfoil maintains laminar flow while operating at a low Reynolds number, and provides a better lift-to-drag ratio than more commonly used airfoils. Alternative embodiments, especially those that house the energy storage mass within the wing, may require profiles with greater spar depth or a lesser degree of camber.

A preferred embodiment for the type of propulsion unit is a fixed pitch propeller with a brushless electric motor drawing power from one or more batteries. This is the simplest configuration which reduces mechanical complexity. However, other embodiments are allowable. Other fuel sources may be used to power the aircraft, such as traditional aircraft liquid fuel, fuel cells, or hybrid power generation systems. Variable pitch propellers could replace or compliment the fixed pitch propellers, which would offer a faster thrust dynamic response. A swashplate mechanism, common to conventional helicopters, would provide rotational torques in addition to the primary thrust force. Alternatively, propeller systems could be omitted, and other mechanisms used in its place, such as rocket or jet propulsion.

A preferred embodiment for the number of propulsion units per satellite vehicle is one, because it reduces the amount of mechanical complexity. However, having additional propulsion units offers several advantages. Any number greater than one offers the possibility of a redundant system in the event of a failure. Furthermore, multiple propulsion units may be used to implement differential thrust, which is a control technique to induce a moment on the satellite vehicle, and eliminate the need for a control surface. Finally, placing a multitude of propulsion units on the leading edge of the airfoil has aerodynamic benefits, because forced air over the wing helps maintain laminar flow.

A preferred embodiment rigidly mounts the propulsion unit with respect to each satellite vehicle, for mechanical simplicity and to reduce the controller complexity. However, an alternative controls methodology may use propulsion units that articulate/rotate with respect to the rigid body. Adjusting the orientation of a propulsion unit, changes the direction of its thrust vector, which induces a moment on the satellite vehicle. This applied moment can be used as a control input, which would eliminate the need for its respective control surface, thereby reducing weight and drag on the system.

A preferred embodiment for the placement of fuselages, propulsion units, stabilizers, and control surfaces is as follows. A single fuselage is located at the outboard portion of the wingtip. A single propulsion unit is located on the nose of the fuselage. A boom extending aft of the fuselage has a single horizontal stabilizer with a control surface. This is the minimal hardware arrangement, such that propulsion overcomes drag, and the system has active pitch stabilization and control. Alternative embodiments permit additional modes of control or a means of reducing the number of control surfaces. For instance, a vertical control surface mounted on the fuselage and aligned with the wing, would adjust the magnitude of the radial force of the satellite vehicle with respect to the aerial system. Similarly, a horizontal control surface mounted on the fuselage and aligned with the wing, would adjust the relative vertical displacement of the satellite vehicle with respect to the aerial system. Both can be used to fine tune the coordinated flight maneuvers of each satellite vehicle with respect to the whole aerial system. Finally, using angled stabilizers and control surfaces requires a more complicated control mixing strategy, but may be used to minimize the number of control surfaces required.

Thus, it has been outlined, rather broadly, the more important features of the invention, in order that the detailed description thereof may be better understood, and in order that the present contribution to the art may be better appreciated. While the previous description outlined some preferred embodiments, and summarized some notable alternative configurations, these descriptions are for illustrative purposes only, and do not limit the scope of the disclosed invention. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention; and together with the description, serve to explain the principles of this invention.

DETAILED DESCRIPTION OF THE INVENTION

Figure 1:
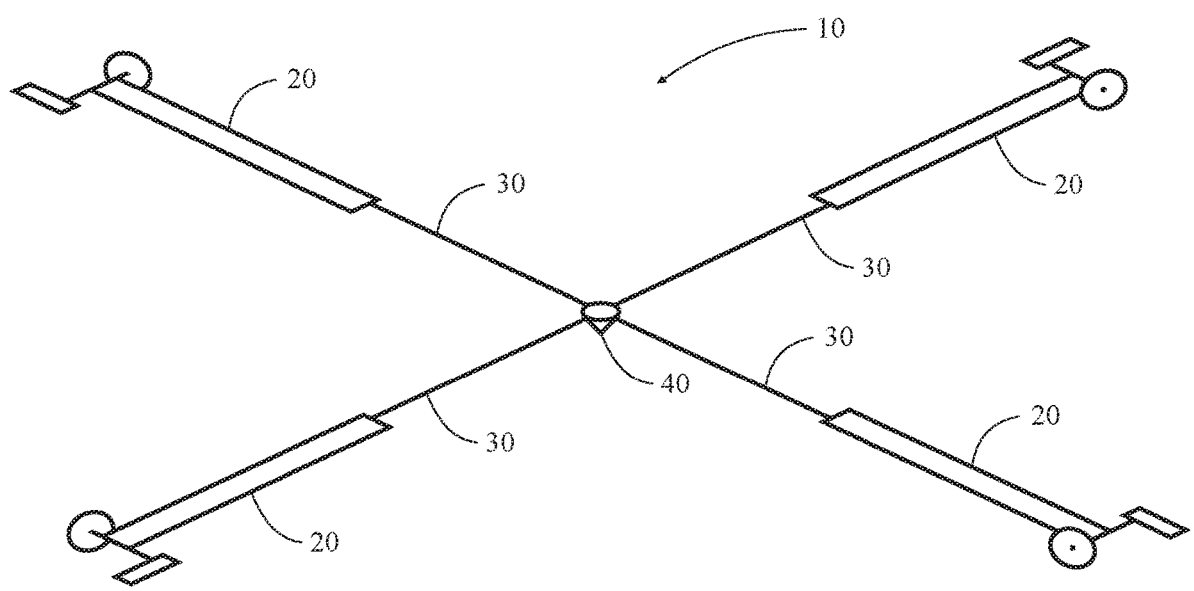
FIG. 1 includes a perspective view of a tethered uni-rotor network aerial system with a central hub according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

According to selected embodiments, the tethered uni-rotor network is an aerial system with tethers that constrain multiple satellite vehicles, where the outboard portion of each tether attaches to an inboard portion of each satellite vehicle. Each satellite vehicle resembles a small aircraft system which includes one or more: fuselages containing avionic components, airfoil lifting sections, propulsion units, stabilizers, and control surfaces. Embodiments of the aerial system herein, operate in a perpetual state of rotation during flight. The rotation is driven by the propulsion units on each of the satellite vehicles. As the system spins, centrifugal forces keep the tethers taught, and places the structural members under tension. Furthermore, as the system spins, each satellite vehicle moves through the air, which generates lift on the winged airfoil sections, which supports the weight of the aerial system.

Figure 2:
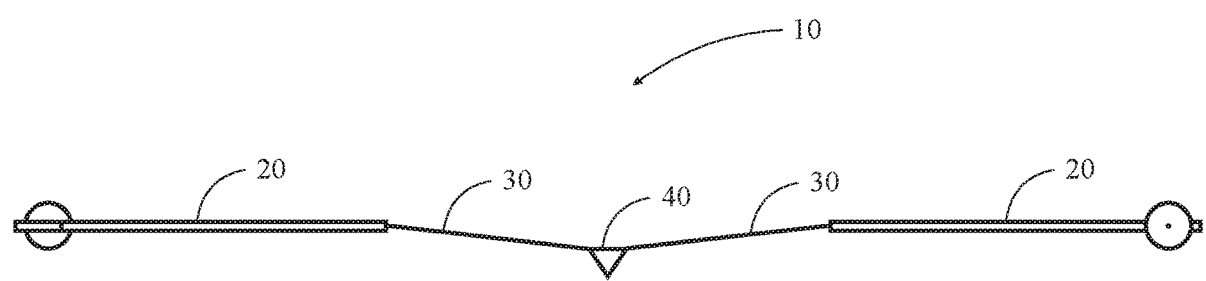
FIG. 2 includes a side view of a tethered uni-rotor network aerial system with a central hub according to selected embodiments of the current disclosure.
Figure 3:
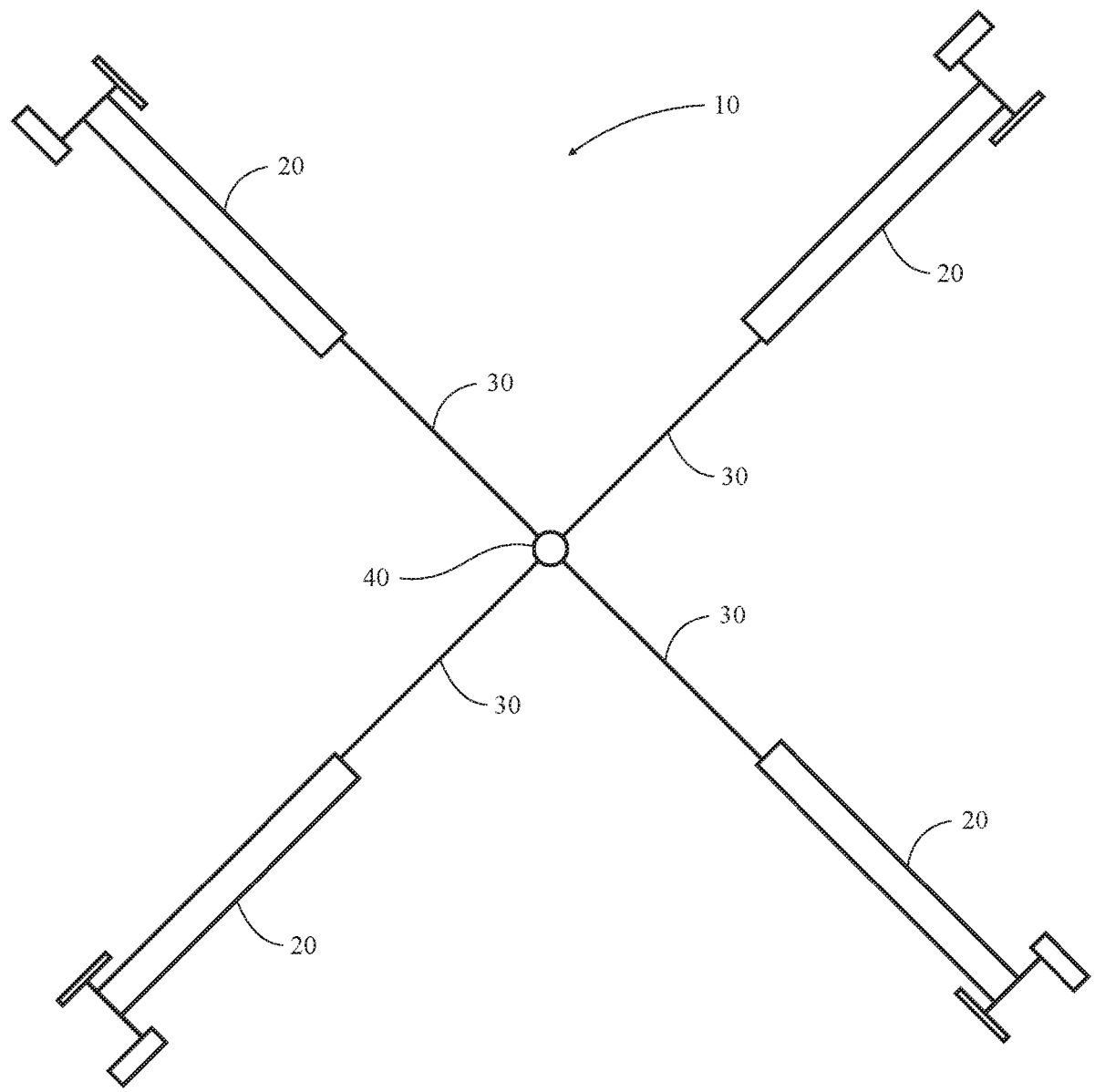
FIG. 3 includes a top view of a tethered uni-rotor network aerial system with a central hub according to selected embodiments of the current disclosure.

FIG. 1 is a perspective view, FIG. 2 is a side view, and FIG. 3 is a top view, of a tethered uni-rotor network aircraft according to selected embodiments of the current disclosure. In this preferred embodiment, the tethered uni-rotor network aircraft 10 includes multiple satellite vehicles 20, in this case four satellite vehicles 20, which are each connected to a central hub 40 via their own tether 30 in a hub-and-spoke arrangement. The satellite vehicles 20 rotate around the central hub 40.

Figure 4:
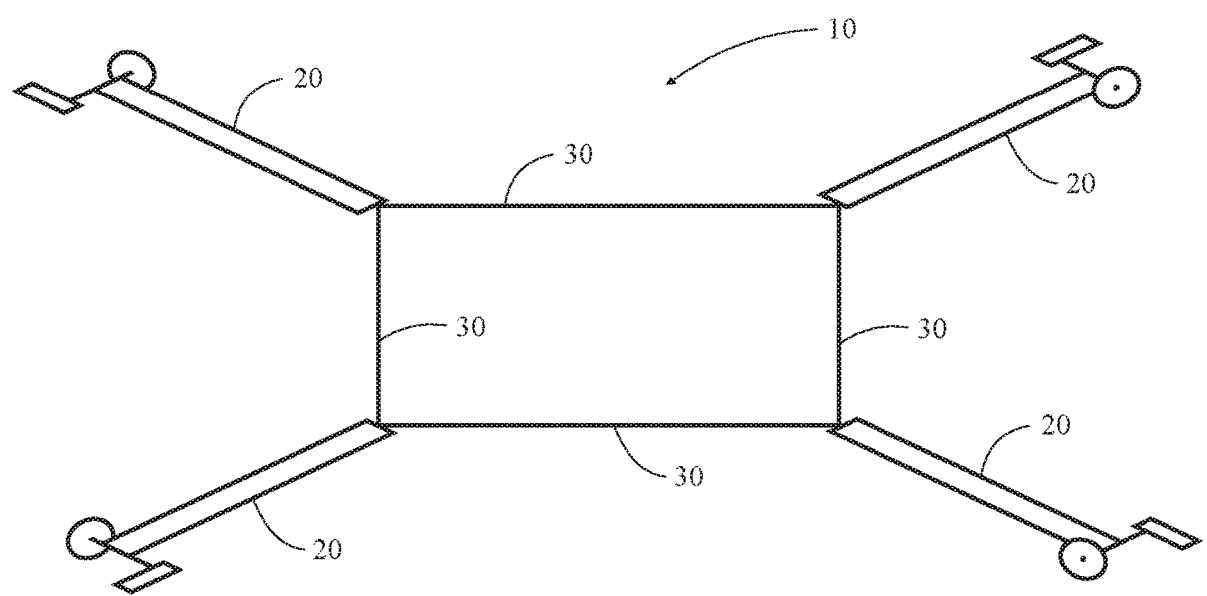
FIG. 4 includes a perspective view of a tethered uni-rotor network aerial system without a central hub according to selected embodiments of the current disclosure.
Figure 5:
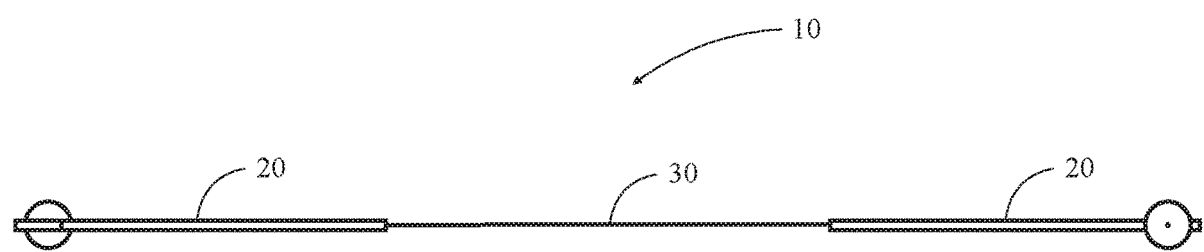
FIG. 5 includes a side view of a tethered uni-rotor network aerial system without a central hub according to selected embodiments of the current disclosure.
Figure 6:
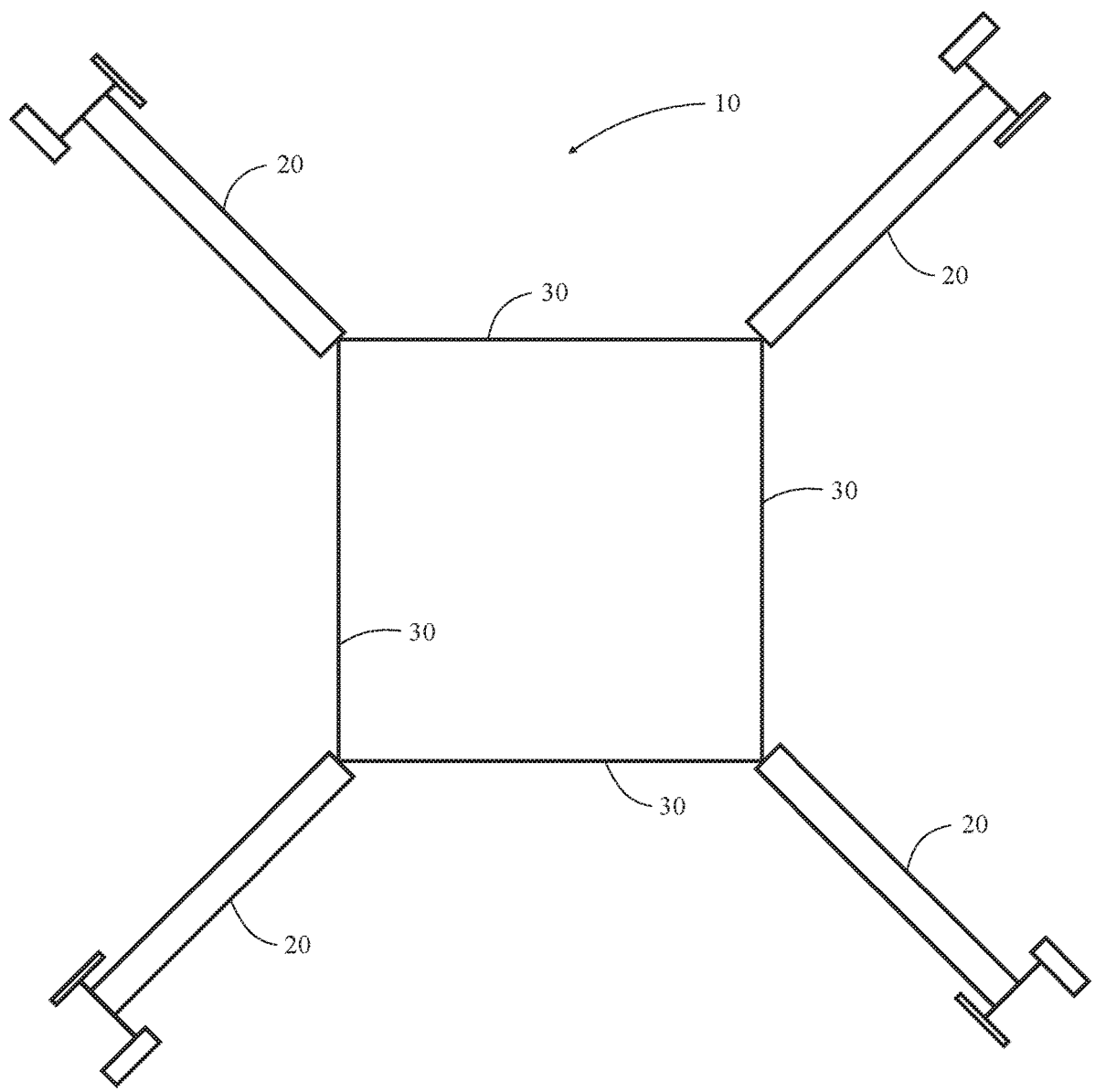
FIG. 6 includes a top view of a tethered uni-rotor network aerial system without a central hub according to selected embodiments of the current disclosure.

FIG. 4 is a perspective view, FIG. 5 is a side view, and FIG. 6 is a top view, of a tethered uni-rotor network aircraft according to selected embodiments of the current disclosure. In this alternative embodiment, the tethered uni-rotor network aircraft 10 includes multiple satellite vehicles 20, in this case four satellite vehicles 20, which are connected to each other via two tethers 30. Each satellite vehicle is tethered to both its leading satellite vehicle neighbor and its trailing satellite vehicle neighbor. This embodiment also operates in a state of rotation which places the structural members under tension, but it accomplishes the task without a central hub.

Figure 7:
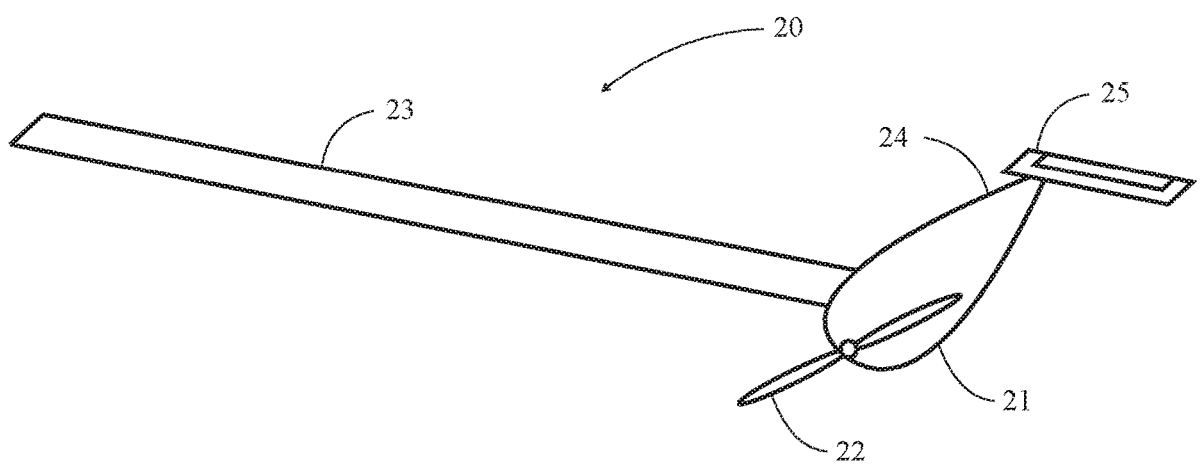
FIG. 7 is a perspective view of a satellite vehicle according to selected embodiments of the current disclosure.
Figure 8:
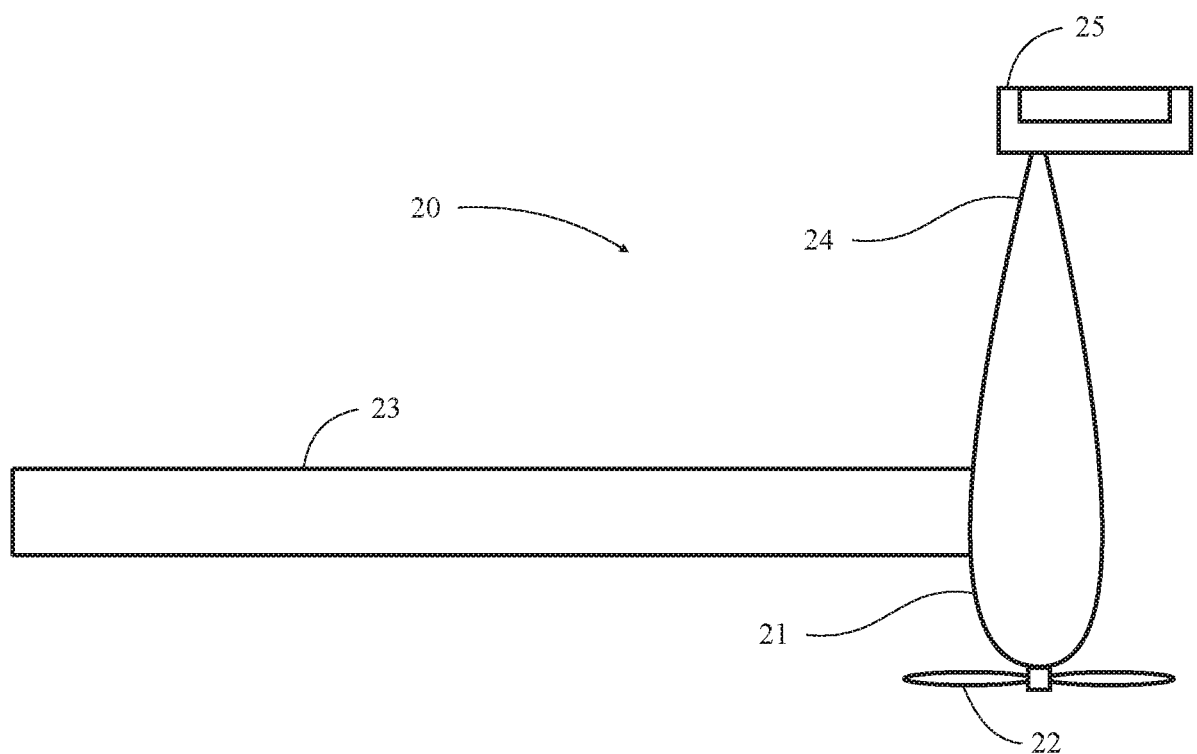
FIG. 8 is a top view of a satellite vehicle according to selected embodiments of the current disclosure.
Figure 9:
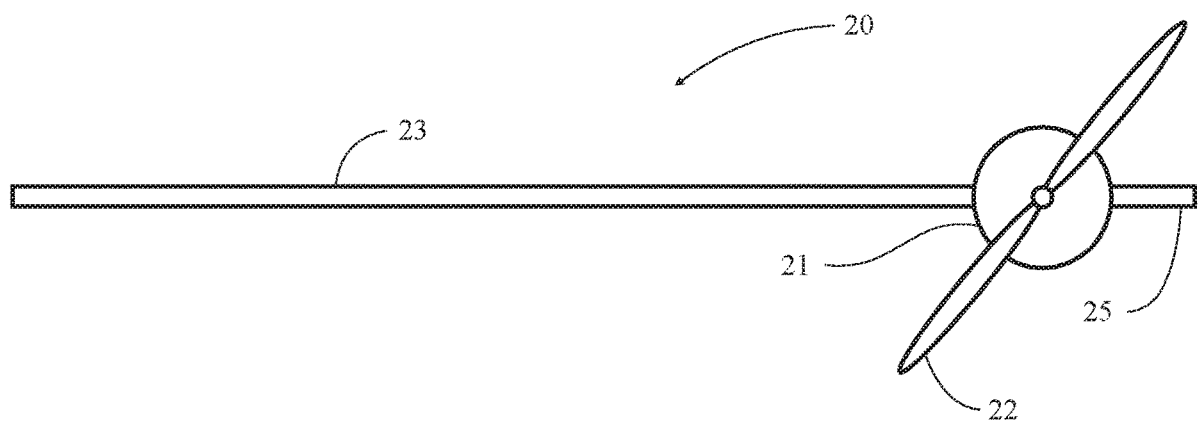
FIG. 9 is a front view of a satellite vehicle according to selected embodiments of the current disclosure.
Figure 10:
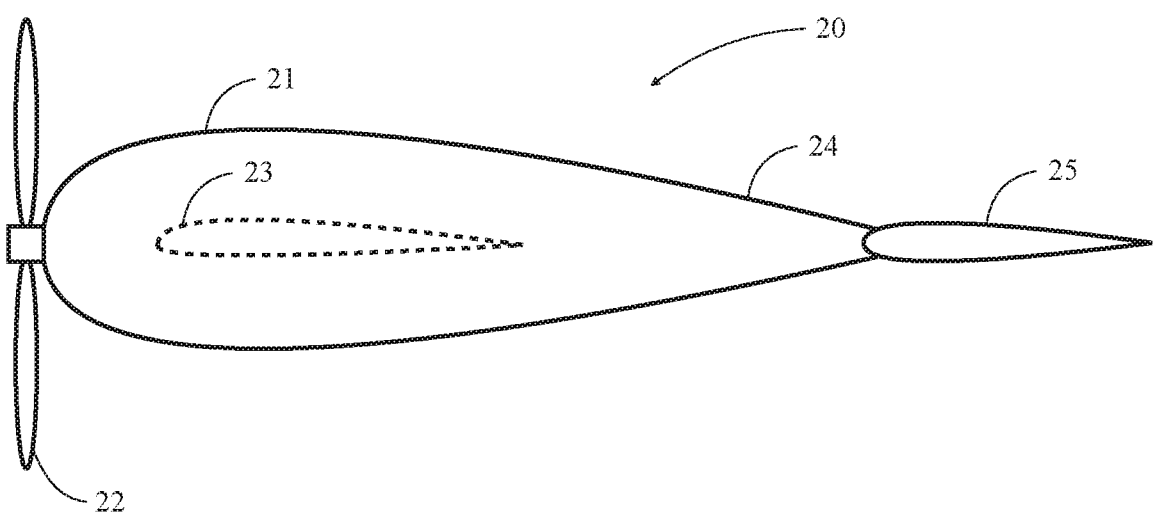
FIG. 10 is a side view of a satellite vehicle according to selected embodiments of the current disclosure.

FIG. 7 is a perspective view, FIG. 8 is a top view, FIG. 9 is a front view, and FIG. 10 is a side view, of a satellite vehicle according to selected embodiments of the current disclosure. The satellite vehicle 20 has fuselages 21, in this embodiment there is one, which has a propulsion unit 22, in this embodiment it is a propeller, to generate thrust. A lifting surface 23, such as a wing, provides lift, which is a generally upward force. A tail boom 24, extending aft of the fuselage, secures a horizontal stabilizer with an elevator 25, which provides pitch control for the satellite vehicle 20. As shown in this figure, the satellite vehicle employs an asymmetrical mono-wing design, with a prop located on the outboard wingtip, and control surfaces located within the prop wash. As will be appreciated by those skilled in the art, other positions, locations, orientations, or geometries of the lifting surfaces, stabilizers, control surfaces, or propulsion units, may be used to control the satellite vehicles.

The satellite vehicle configuration depicted within the previous four figures is considered to be the ideal embodiment of the current disclosure. A single propulsion unit on each satellite system is the minimum number needed to overcome aerodynamic drag. Mounting the propulsion unit on the outboard wingtip provides the most centrifugal benefit, but inboard or middle placements are conceivable as well. Since each satellite vehicle is subjected to centrifugal force, the roll and yaw axes of each satellite vehicle are asymptotically stable. Thus, a single horizontal stabilizer with elevator control surface, is the bare minimum needed to provide active pitch control and stabilization. Later paragraphs will outline how additional stabilizers and control surfaces may be used within the design.

Figure 11:
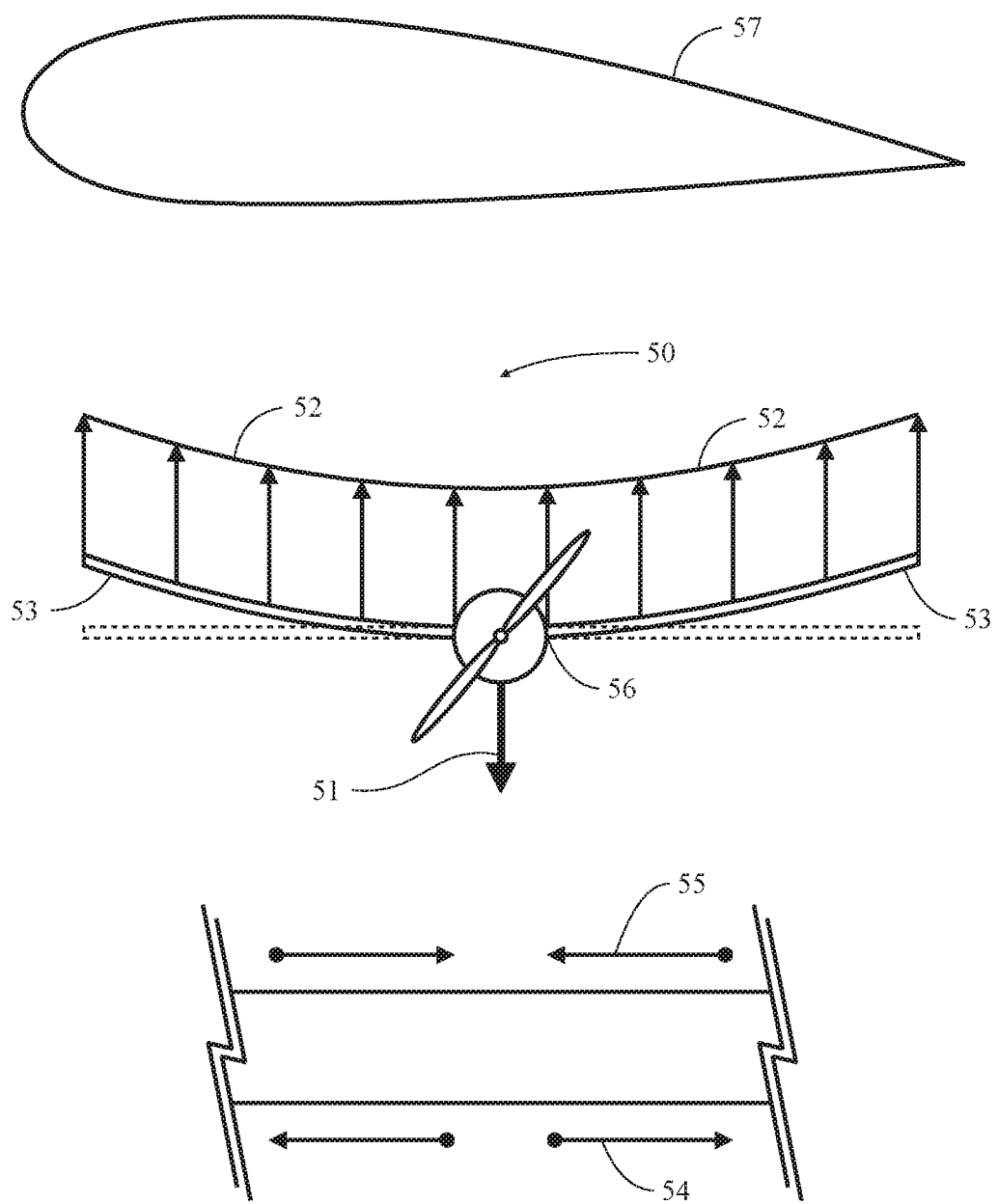
FIG. 11 is an illustration which shows a front view of a traditional fixed-wing aircraft, and its resultant bending moment across the wing.

FIG. 11 is a diagram which illustrates the bending moment within traditional fixed-wing aircraft. A traditional aircraft 50 has a weight force 51 located at the center of gravity, and a lift force 52 distributed across its wing. These forces tend to deflect the wing and its structural members, which puts the bottom surface under tension 54 while the top surface is subjected to compression 55. Many materials, especially those with carbon fiber composites, perform significantly better under tension than under compression. As such, the wing root 56, which is the connection point between the wing and the fuselage, requires additional structural material, and the wing profile 57 must have a suitable thickness to overcome this compression force arising from the bending moment.

Figure 12:
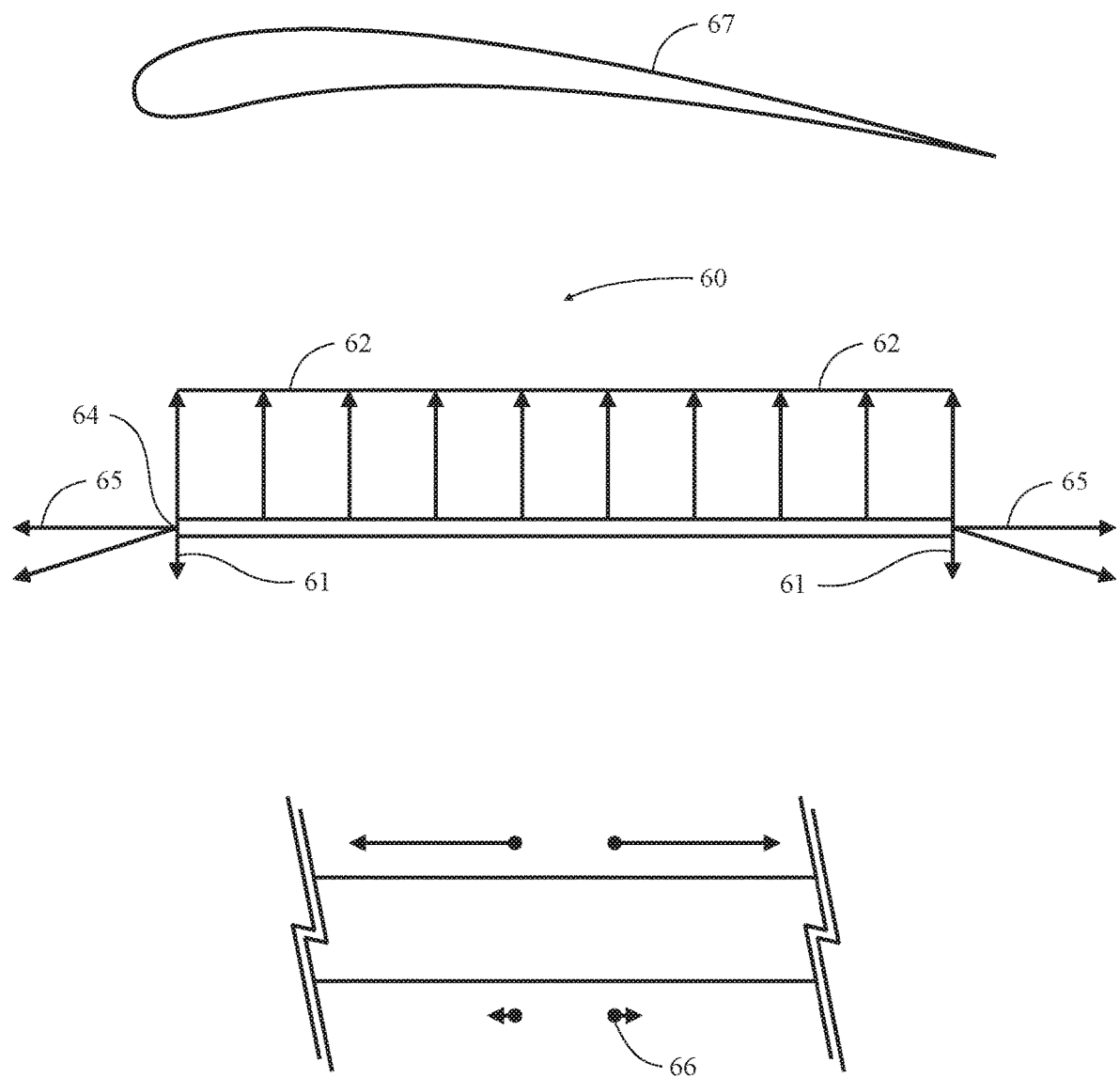
FIG. 12 is an illustration which shows how centrifugal stiffening alleviates a bending moment across the structural member of a wing according to selected embodiments of the current disclosure.

FIG. 12 is a diagram which illustrates how the tethered uni-rotor network system, disclosed herein, has the same beneficial centrifugal stiffening as a traditional helicopter rotor, to overcome the structural problems inherent within fixed-wing aircraft. Inboard sections are comprised of a thin tether filament, which eliminates an underutilized structure from a helicopter design. Because the satellite wingtip is free to pivot about the tether connection point 64, there is no detrimental bending moment which is typically found at the wing root of fixed-wing aircraft designs. Weight 61 still acts downward, and the lift force 62 is still distributed across the wing, but with the tethered uni-rotor network approach, there is also centrifugal force 65 pulling the wing and its structural members under tension. As such, the centrifugal stiffening within each satellite vehicle can offset the compression loads and place the entire structural member under tension 66. This reduces the total mass of the structural member, allows for much greater aspect ratios than can be attained by a traditional tube-and-wing style aircraft, and permits thin-thickness, high-camber airfoils 67 with much better lift-to-drag ratios than standard practice.

Figure 13:
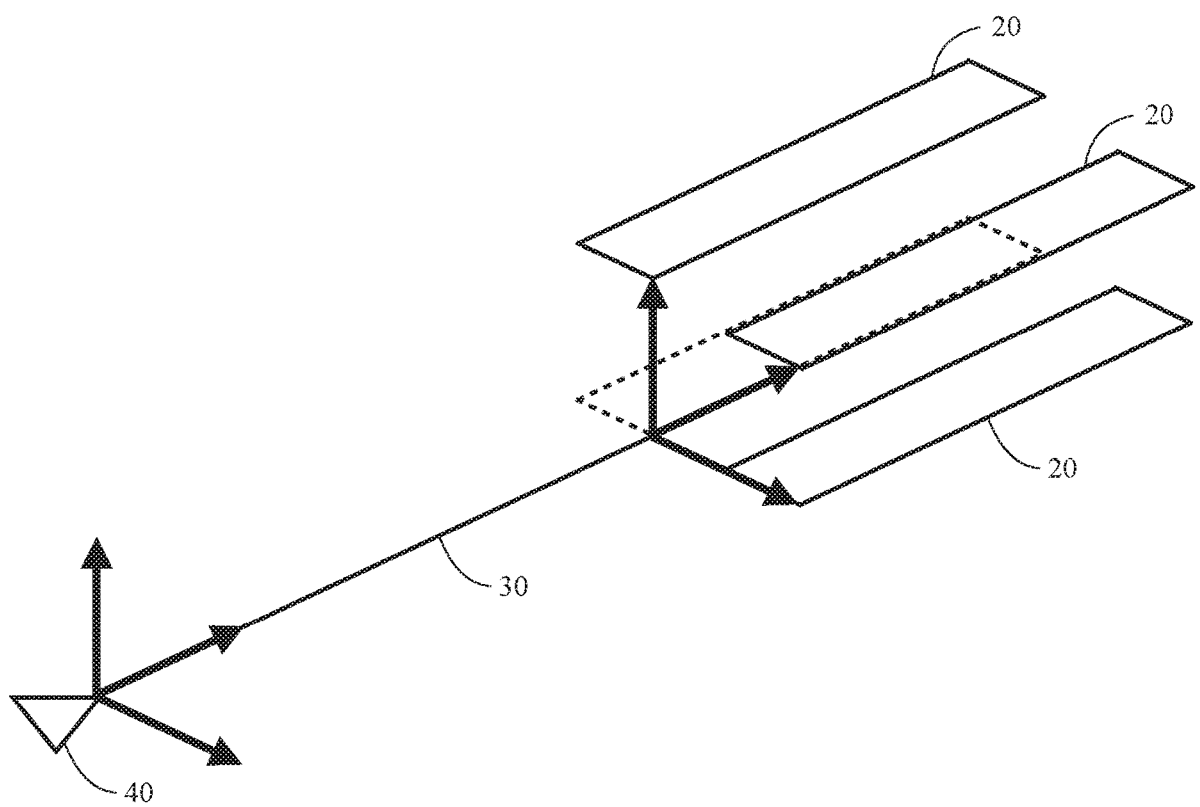
FIG. 13 is a diagram showing the interacting forces transmitted by the tether between the satellite vehicle and the central hub according to selected embodiments of the current disclosure.

FIG. 13 is a diagram showing the interacting forces transmitted through the tether between the satellite vehicle and the central hub according to selected embodiments of the current disclosure. As the system operates in a persistent state of rotation, three components of a force vector act at the connection point on the central hub. A vertical force counteracts the weight of the central hub, a lateral force arises from the aerodynamic drag pulling on the tether, and a radial force arises from the centrifugal forces present from the rotation of the system. These three forces are present even during the hover operation of the tethered uni-rotor network system. However, altering the relative position of a satellite vehicle with respect to the central hub, will also alter the magnitude of the component forces acting on the central hub anchor point. As the satellite vehicle 20 moves away from the central hub 40, the satellite vehicle 20 pulls on the tether 30, which in turn increases the magnitude of the radial force on the central hub 40. Similarly, moving inward decreases the magnitude of the vector. As the satellite vehicle 20 moves upward with respect to the central hub 40, the satellite vehicle 20 pulls upward on the tether 30, which in turn increases the magnitude of the vertical force on the central hub 40. Similarly, moving downward decreases the magnitude of the vector. As the satellite vehicle 20 moves forward with respect to the central hub 40, the satellite vehicle 20 pulls forward on the tether 30, which in turn increases the magnitude of the lateral force on the central hub 40. Similarly, moving backward decreases the magnitude of the vector. As long as there is tension within the tether from the rotation of the aerial system, these forces are transferred to the hub, subject to drag and other frictional losses. Although the central hub has no active controls of its own, navigating the tethered uni-rotor network can be accomplished through coordinated flight maneuvers, which impart the desired forces on the central hub, such that the entire system achieves translation. A similar controls methodology may be applied to the tethered uni-rotor network embodiment without a central hub, except the control architecture must monitor the dynamic interactions between the satellite vehicles, rather than forces imparted on a central hub.

Figure 14:
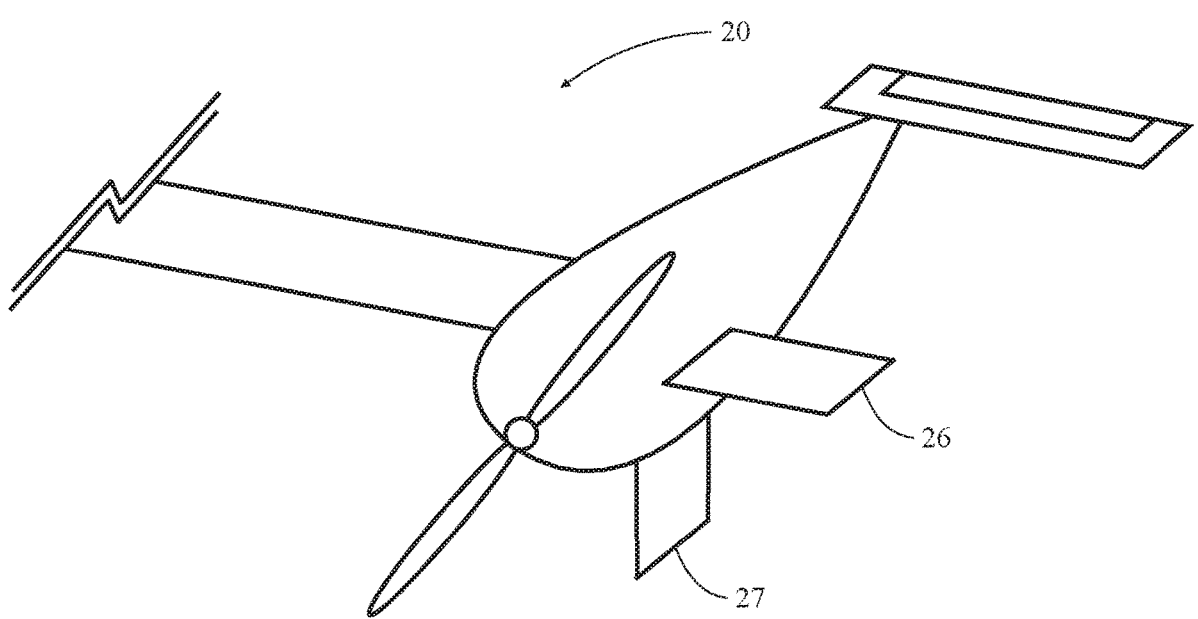
FIG. 14 is a perspective view of a satellite vehicle with additional vertical and horizontal control surfaces according to selected embodiments of the current disclosure.

While a single propulsion unit and a single elevator is sufficient to achieve the coordinated maneuvers needed by the central hub, FIG. 14 illustrates how additional stabilizers and control surfaces may be employed by the tethered uni-rotor network. A horizontal control surface 26 mounted on the fuselage and aligned with the quarter chord of the wing, would provide a vertical force on the satellite vehicle. This control input could independently adjust the relative vertical position of the satellite vehicle without altering its pitch angle. Similarly, a vertical control surface 27 mounted on the fuselage and aligned with the quarter chord of the wing, would provide a radial force which increases or decreases the tension on the tether. When applied cyclically, this control input could induce horizontal translation within the aerial system, without requiring cyclic throttle commands for an advancing/retreating rotor blade control approach. Similarly, angled stabilizers and control surfaces may be used to reduce the number of surfaces, but will generally require a more complicated control mixing strategy.

Each satellite vehicle needs a propulsion unit, which counteracts aerodynamic drag acting on the body, while keeping the tethered uni-rotor network aircraft in a state of rotation. A preferred embodiment uses fixed pitch propellers with brushless electric motors drawing power from one or more battery systems, because of its simplicity. Other means of propulsion units are also acceptable. Variable pitch propellers could replace or compliment fixed pitch propellers, to provide a faster dynamic response. A swashplate design, common within traditional helicopters, could provide torque commands in addition to the primary thrust force. Various fuel sources; like traditional aviation liquid fuel, fuel cells, or hybrid power systems; could replace or compliment an electric power supply. Or a propeller methodology could be completely omitted, and jet or rocket systems could be elected to provide thrust for each satellite vehicle.

Figure 15:
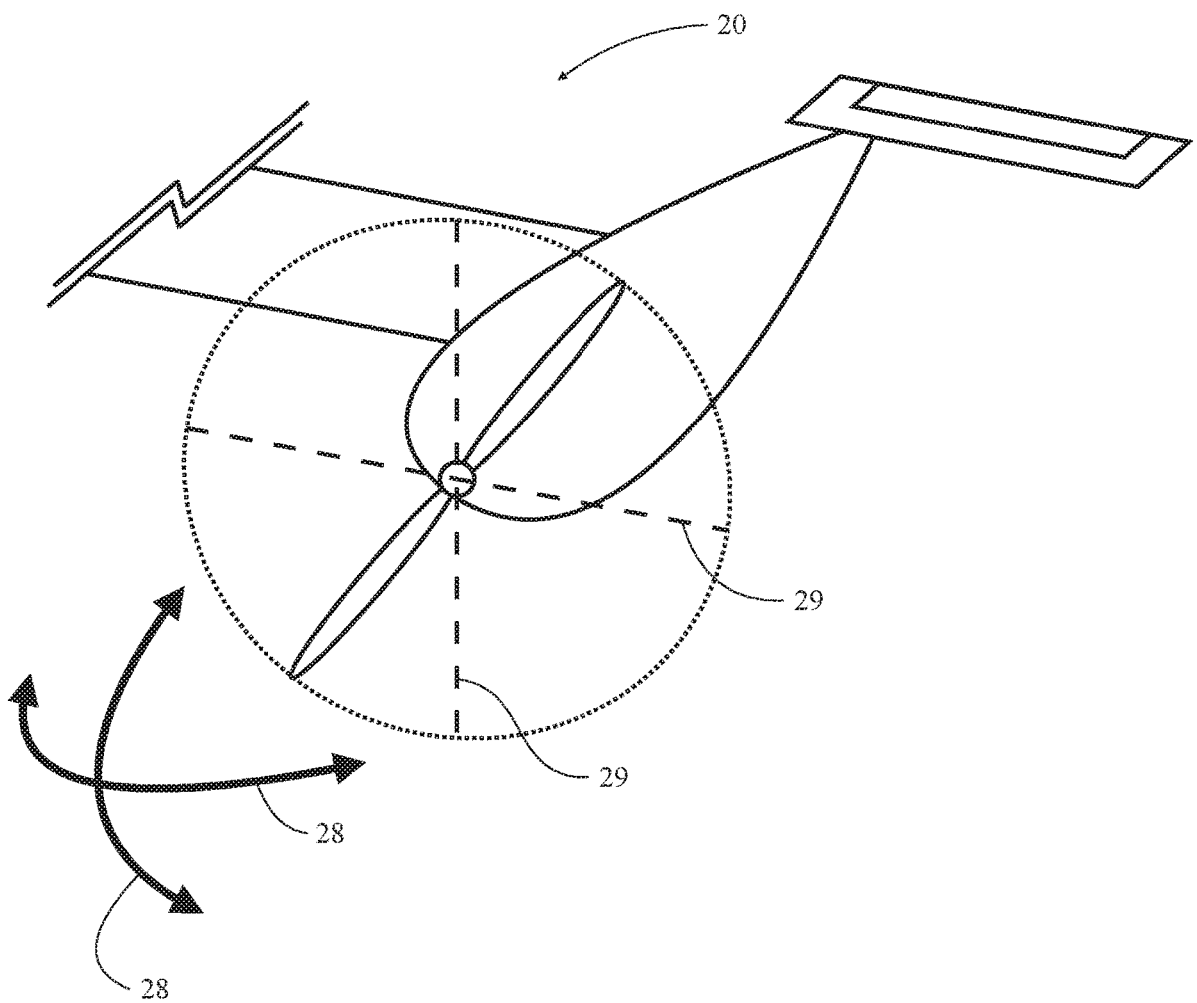
FIG. 15 is a perspective view of a satellite vehicle with a gimbal or articulated propulsion unit according to selected embodiments of the current disclosure.

FIG. 15 is a perspective view of a satellite vehicle with a gimbal or articulated propulsion unit according to selected embodiments of the current disclosure. The fuselage 21 includes one or more gimbals or hinge joints 29 that support the propulsion unit 22, in this embodiment it is a propeller. The propulsion unit 22 rotates in various directions and in one or more axes 28 relative to the satellite vehicle 20 via the gimbals or hinge joints 29. The various directions of the propulsion unit alters the direction of thrust which acts on the satellite vehicle 20, and produces a moment that can be used as a control input. Degrees of freedom within the propulsion unit mechanism may reduce the number of stabilizers, control surfaces, or both.

Figure 16:
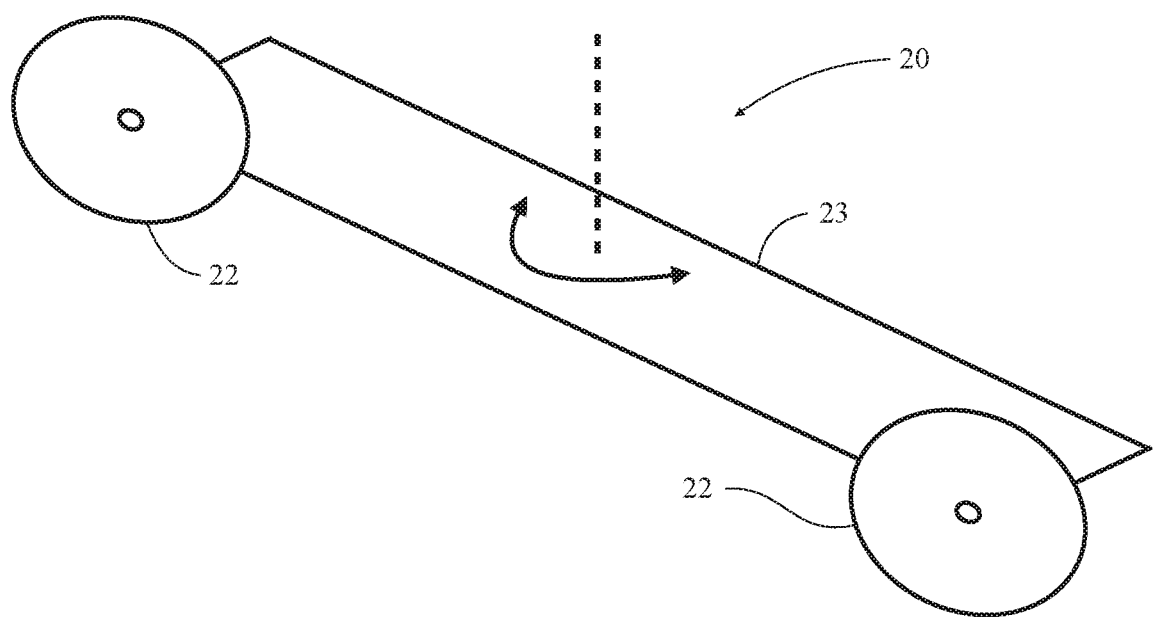
FIG. 16 depicts a perspective view of a satellite vehicle employing differential thrust for yaw control according to selected embodiments of the current disclosure.
Figure 17:
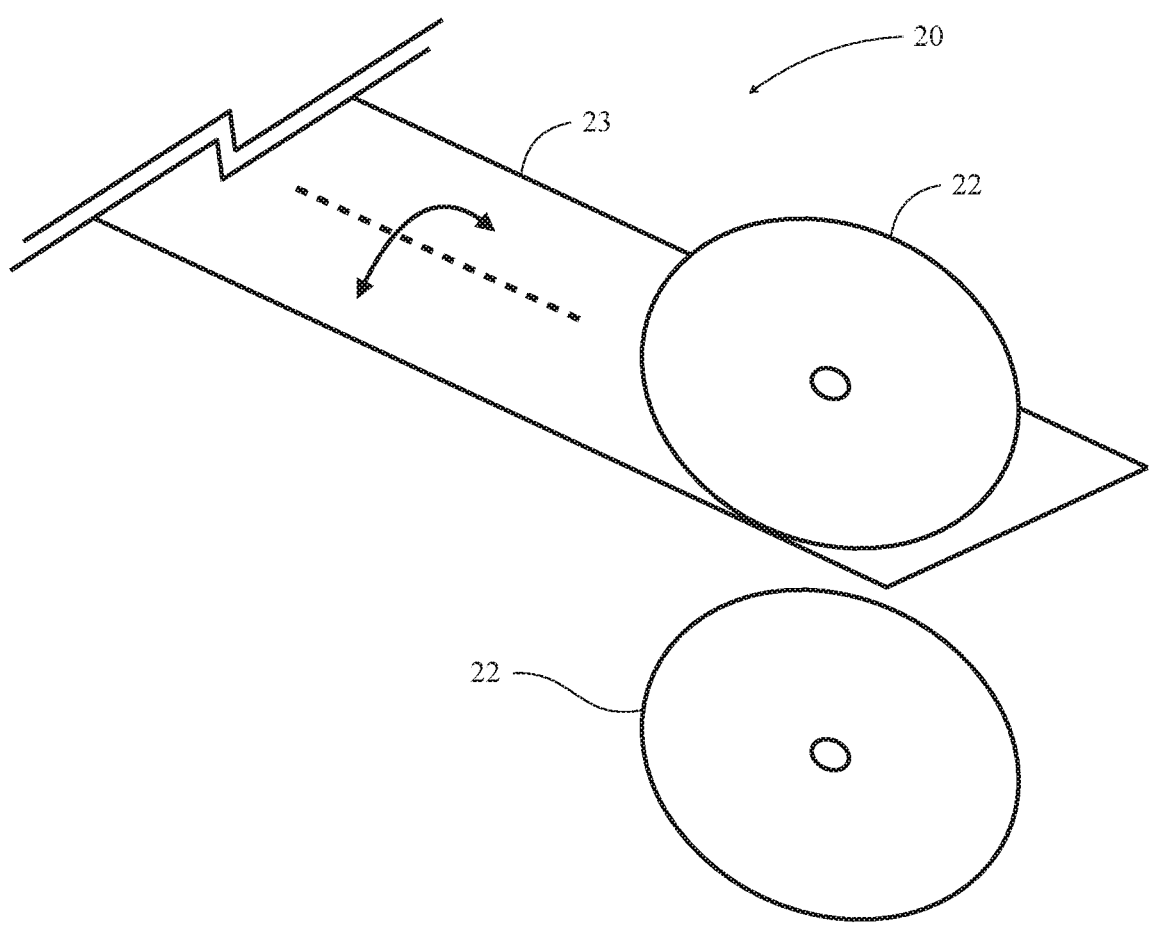
FIG. 17 depicts a perspective view of a satellite vehicle employing differential thrust for pitch control according to selected embodiments of the current disclosure.
Figure 18:
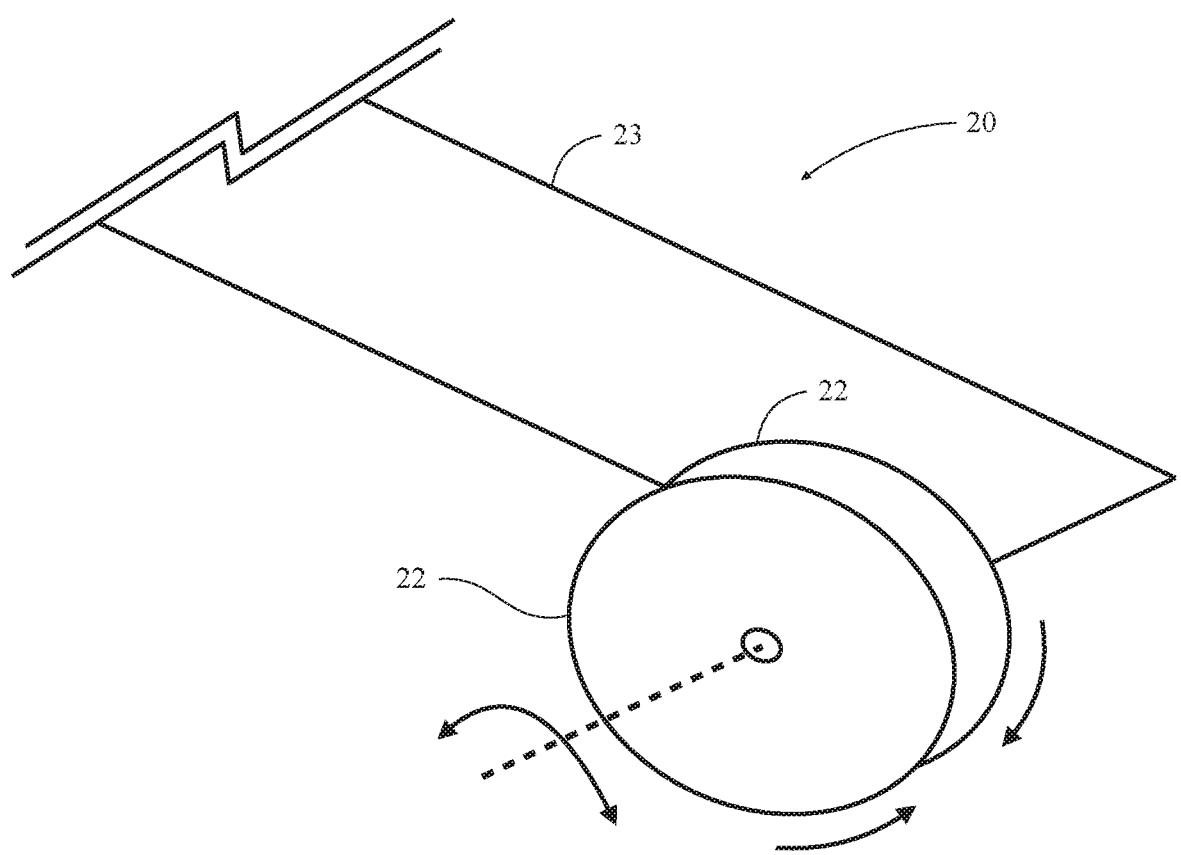
FIG. 18 depicts a perspective view of a satellite vehicle employing differential thrust for roll control according to selected embodiments of the current disclosure.

The next three figures showcase the application of differential thrust according to selected embodiments of the current disclosure. Differential thrust is a control mixing strategy which adjusts multiple motors off of their nominal control inputs, to impart a moment on the system while maintaining the same net force between all the propulsion units. This technique can be used to reduce the number of control surfaces needed. FIG. 16 has two propulsion units 22, mounted on both wingtips of a satellite vehicle, such that simultaneously increasing/decreasing these two motors produces a yaw moment. FIG. 17 has two propulsion units 22, both located at the outboard wingtip, with one above and one below the wing plane, such that simultaneously increasing/decreasing these two motors produces a pitch moment. FIG. 18 shows a pair of coaxial propulsion units 22, both located at the outboard wingtip, but spinning in opposite directions, such that simultaneously increasing/decreasing these two motors changes the resultant motor torques, and produces a roll moment on the satellite vehicle. Implementing differential thrust does not require pairs of exactly two propulsion units aligned with any specific axis. Those skilled in the art, will appreciate that suitable control mixing can achieve similar results from any number of multiple propulsion units within a wide variety of layout arrangements.

Figure 19:
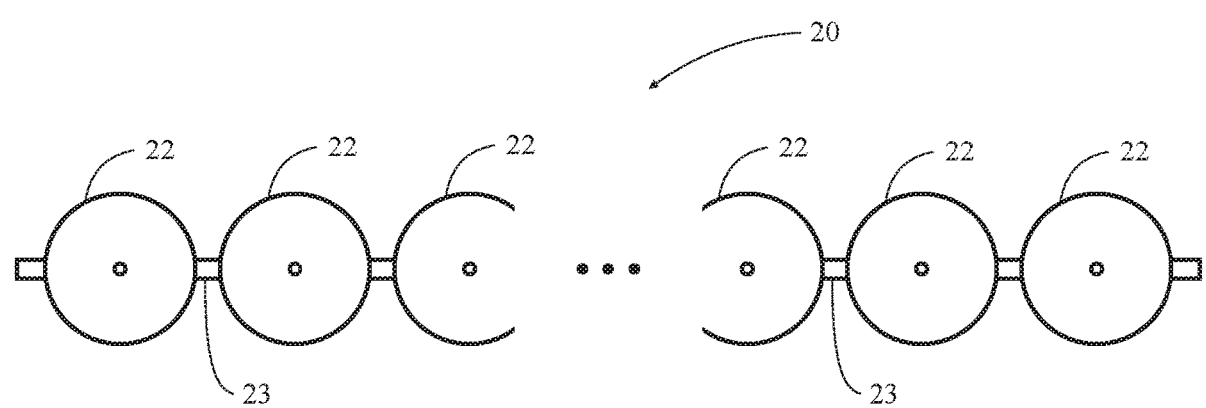
FIG. 19 is a front view of a satellite vehicle with a plurality of propulsion units distributed across the wingspan according to selected embodiments of the current disclosure.

FIG. 19 is a front view of a satellite vehicle with a plurality of propulsion units according to selected embodiments of the current disclosure. Many propulsion units 22 mounted onto their respective fuselages 21 are distributed across the leading edge of the winged lifting surface 23 of the satellite vehicle 20. This configuration applies forced air over the airfoil which may lead to better laminar flow over the wing surface. However, these additional propulsion units represent an engineering tradeoff that must be evaluated against any extra weight and manufacturing complexity.

Embodiments of the current disclosure provide for an aerial system with multiple satellite vehicles tethered together. One satellite vehicle is not a valid configuration because there is no means of counter balancing the rotation. Two satellite vehicles are able to counter balance one another, but if a central hub is present, it is free to swing like a hammock. Thus, this configuration should only be used when there is no central hub, or as a means of recovering the aerial system should a satellite vehicle become disabled, or as part of a system that constrains the central hub in other ways, like the primary tether on an airborne wind energy device. Three satellite vehicles are the minimum number needed to achieve stability within the central hub if one is present, but the disadvantage is that, for an odd number of satellite vehicles, horizontal translation is more difficult to control, because pairs of satellite vehicles are not directly opposite one another. Four satellite vehicles have slightly less ideal centrifugal stiffening than three satellite vehicles, but it is easier to implement horizontal translation because pairs of satellite vehicles are directly opposed to one another. Five or more satellite vehicles are all physically possible, and could be used to carry larger payloads within the central hub, or to add redundancy and robustness to the system as a safety measure, but adding more satellite vehicles increases complexity and compromises the amount of centrifugal stiffening within each satellite vehicle.

It should be understood that while the preferred embodiments of the invention are described in some detail herein, the present disclosure is made by way of example only. Variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed is:

1. An aerial system comprising:
a central hub, two or more satellite vehicles, and two or more tethers which secure each satellite vehicle to the central hub, which radiate outward in a hub-and-spoke arrangement;
where the aerial system operates in a state of rotation;
where each satellite vehicle comprises one or more wings to generate lift;
where one or more of the wings comprises one or more structural members to maintain the rigidity of the wing;
where each tether attaches to an inboard portion of the wing on each satellite vehicle;
such that, the rotation of the aerial system subjects each satellite vehicle to a centrifugal force;
such that, the location of each tether connected to the inboard portion of the wing on each satellite vehicle places the one or more wings under tension;
such that, a bending moment is reduced or eliminated within each structural member;
such that, reducing the bending moment within the structural members, permits higher aspect ratio wings than those that do not use centrifugal stiffening.

2. The aerial system of claim 1, wherein each satellite vehicle further comprises one or more propulsion units, where each of the one or more propulsion units has a thrust vector.

3. The aerial system of claim 2, wherein one or more of the propulsion units can orient its thrust vector relative to the satellite vehicle as a means of controlling each satellite vehicle.

4. The aerial system of claim 2, wherein one or more of the propulsion units uses a variable pitch or a swashplate design as a means of controlling each satellite vehicle.

5. The aerial system of claim 2, wherein two or more of the propulsion units use differential thrust as a means of controlling each satellite vehicle.

6. The aerial system of claim 1, wherein each satellite vehicle further comprises one or more stabilizers to reject external disturbances acting on each satellite vehicle.

7. The aerial system of claim 1, wherein each satellite vehicle further comprises one or more control surfaces to adjust the trajectory of each satellite vehicle.

8. The aerial system of claim 1, wherein each satellite vehicle further comprises one or more solar arrays for solar energy collection.

9. The aerial system of claim 1, wherein each satellite vehicle further comprises one or more internal combustion engines for propulsion or other power requirements.

10. The aerial system of claim 1, wherein each satellite vehicle further comprises one or more batteries for propulsion or other power requirements.

11. The aerial system of claim 1, wherein each satellite vehicle further comprises one or more fuel cells for propulsion or other power requirements.

12. The aerial system of claim 1, wherein each satellite vehicle further comprises one or more hybrid power generation systems for propulsion or other power requirements.

13. The aerial system of claim 1, wherein the number of satellite vehicles is three.

14. The aerial system of claim 1, wherein the number of satellite vehicles is four.

15. An aerial system comprising:
two or more satellite vehicles in a radial arrangement, and one or more tethers which secure the satellite vehicles to one another, such that each satellite vehicle is attached to its leading and trailing neighbors;
where the aerial system operates in a state of rotation;
where each satellite vehicle comprises one or more wings to generate lift;
where one or more of the wings comprises one or more structural members to maintain the rigidity of the wing;
where each tether attaches to an inboard portion of the wing on each satellite vehicle;
such that, the rotation of the aerial system subjects each satellite vehicle to a centrifugal force;
such that, the location of each tether connected to the inboard portion of the wing on each satellite vehicle places the one or more wings under tension;
such that, a bending moment is reduced or eliminated within each structural member;
such that, reducing the bending moment within the structural members, permits higher aspect ratio wings than those that do not use centrifugal stiffening.

16. The aerial system of claim 15, wherein each satellite vehicle further comprises one or more propulsion units, where each of the one or more propulsion units has a thrust vector.

17. The aerial system of claim 16, wherein one or more of the propulsion units can orient its thrust vector relative to the satellite vehicle as a means of controlling each satellite vehicle.

18. The aerial system of claim 16, wherein one or more of the propulsion units uses a variable pitch or a swashplate design as a means of controlling each satellite vehicle.

19. The aerial system of claim 16, wherein two or more of the propulsion units use differential thrust as a means of controlling each satellite vehicle.

20. The aerial system of claim 15, wherein each satellite vehicle further comprises one or more stabilizers to reject external disturbances acting on each satellite vehicle.

21. The aerial system of claim 15, wherein each satellite vehicle further comprises one or more control surfaces to adjust the trajectory of each satellite vehicle.

22. The aerial system of claim 15, wherein each satellite vehicle further comprises one or more solar arrays for solar energy collection.

23. The aerial system of claim 15, wherein each satellite vehicle further comprises one or more internal combustion engines for propulsion or other power requirements.

24. The aerial system of claim 15, wherein each satellite vehicle further comprises one or more batteries for propulsion or other power requirements.

25. The aerial system of claim 15, wherein each satellite vehicle further comprises one or more fuel cells for propulsion or other power requirements.

26. The aerial system of claim 15, wherein each satellite vehicle further comprises one or more hybrid power generation systems for propulsion or other power requirements.

27. The aerial system of claim 15, wherein the number of satellite vehicles is three.

28. The aerial system of claim 15, wherein the number of satellite vehicles is four.

29. An aerial system comprising:
- a central hub, two or more satellite vehicles, and two or more tethers which secure each satellite vehicle to the central hub, which radiate outward in a hub-and-spoke arrangement;
- where the aerial system always operates in a state of rotation;
- where the central hub is a permanent member of the aerial system;
- where the central hub rotates with the aerial system;
- where each satellite vehicle comprises one or more wings to generate lift;
- where one or more of the wings comprises one or more structural members to maintain the rigidity of the wing;
- where each tether attaches to an inboard portion of the wing on each satellite vehicle;
- where each satellite vehicle utilizes an asymmetrical layout;
- such that, the rotation of the aerial system subjects each satellite vehicle to a centrifugal force;
- such that, the location of each tether connected to the inboard portion of the wing on each satellite vehicle places the one or more wings under tension;
- such that, a bending moment is reduced or eliminated within each structural member;
- such that, reducing the bending moment within the structural members, permits higher aspect ratio wings than those that do not use centrifugal stiffening.

30. An aerial system comprising:
- two or more satellite vehicles in a radial arrangement, and one or more tethers which secure the satellite vehicles to one another, such that each satellite vehicle is attached to its leading and trailing neighbors;
- where the aerial system always operates in a state of rotation;
- where each satellite vehicle comprises one or more wings to generate lift;
- where one or more of the wings comprises one or more structural members to maintain the rigidity of the wing;
- where each tether attaches to an inboard portion of the wing on each satellite vehicle;
- where each satellite vehicle utilizes an asymmetrical layout;
- such that, the rotation of the aerial system subjects each satellite vehicle to a centrifugal force;
- such that, the location of each tether connected to the inboard portion of the wing on each satellite vehicle places the one or more wings under tension;
- such that, a bending moment is reduced or eliminated within each structural member;
- such that, reducing the bending moment within the structural members, permits higher aspect ratio wings than those that do not use centrifugal stiffening.

* * * * *